April 24, 1934. E. G. DANIELS ET AL 1,955,737
ART OF WELDING
Filed Dec. 15, 1932 2 Sheets-Sheet 1
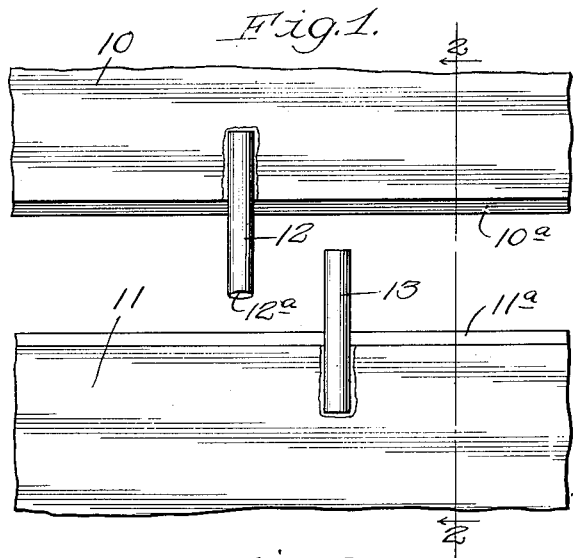
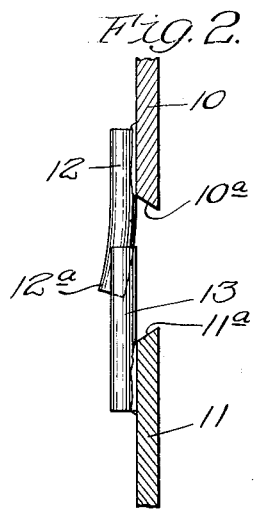
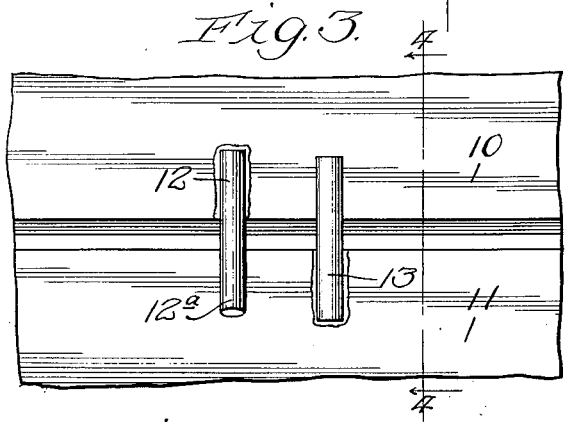
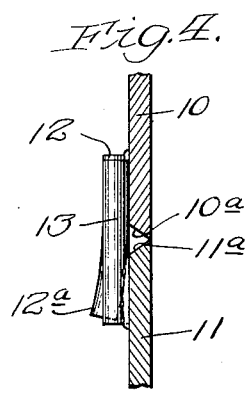
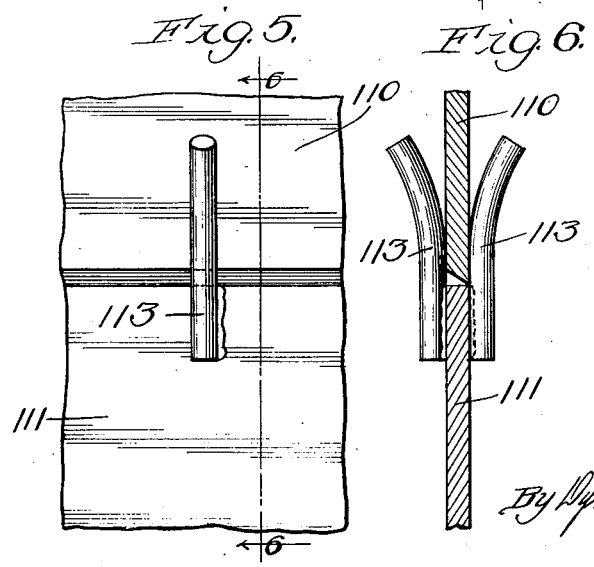
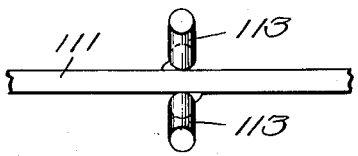
Inventors
Edwin G. Daniels,
Frank L. Wurst,
By Dynrforth, Lee, Clinton & Wiles,
Attys.

April 24, 1934.  E. G. DANIELS ET AL  1,955,737
ART OF WELDING
Filed Dec. 15, 1932  2 Sheets-Sheet 2
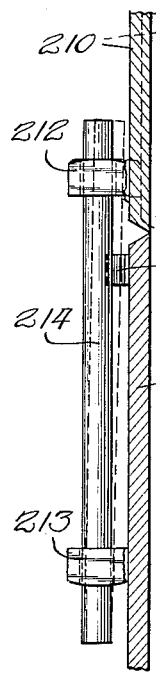
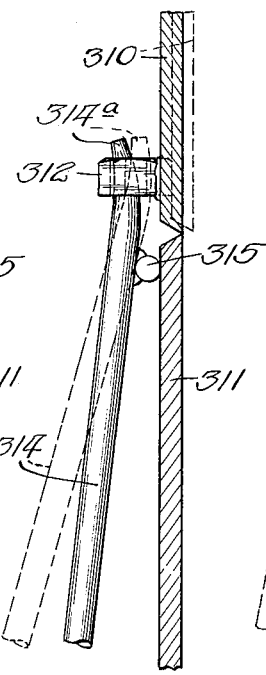
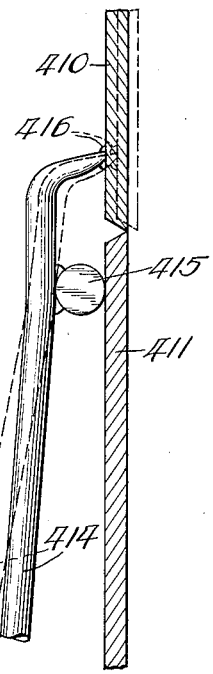
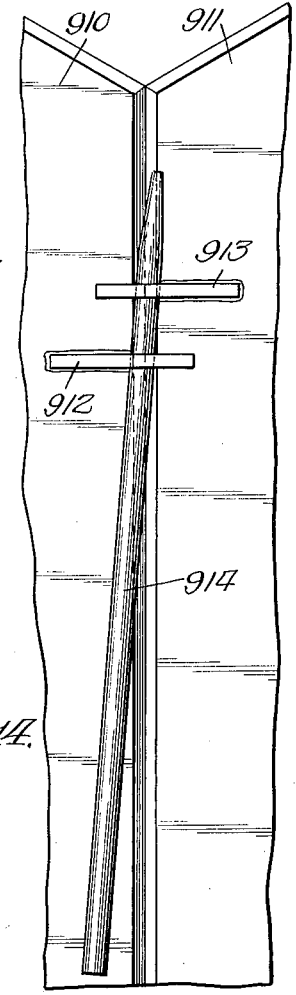
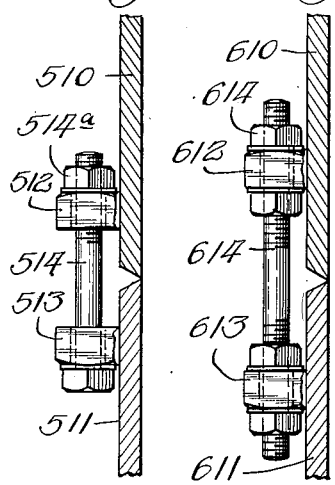
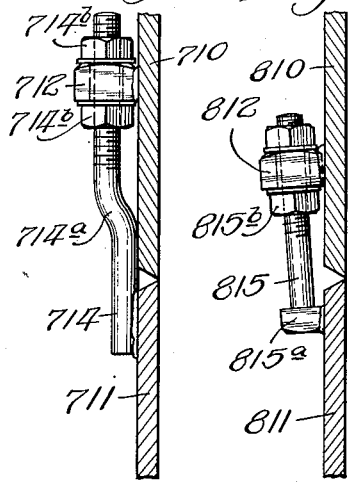
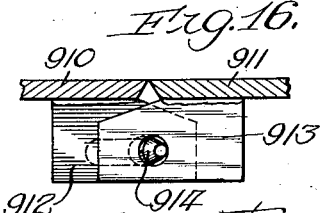
Inventors:
Edwin G. Daniels,
Frank L. Wurst,
By Byrnforth, Lee, Chritton & Wiles,
Attys.

Patented Apr. 24, 1934

1,955,737

UNITED STATES PATENT OFFICE 1,955,737

ART OF WELDING

Edwin G. Daniels and Frank L. Wurst, Chicago, Ill., assignors to Chicago Bridge & Iron Company, Chicago, Ill., a corporation of Illinois Application December 15, 1932, Serial No. 647,428

7 Claims. (Cl. 113—112)

This invention relates to improvements in the art of welding and, more especially, the art of butt welding the edges of two adjacent plates. The invention may be employed, for example, in making welded tanks.

Among the features of our invention are improved methods and devices for assisting in assembling the plates and holding them in registry during the welding operation. By the use of our invention, the plates can be easily and quickly brought into proper position; and lateral displacement from the welding position is prevented.

Other features and advantages of our invention will appear more fully as we proceed with our specification.

In those forms of devices, used in the practice of our inventions, shown in the accompanying drawings—

Figure 1 is a view in side elevation; Fig. 2 is a view taken as indicated by the line 2 of Fig. 1; Fig. 3 is a view similar to Fig. 1, showing the plates in welding position; Fig. 4 is a view taken as indicated by the line 4 of Fig. 3; Fig. 5 is a view similar to Fig. 1, showing another modification; Fig. 6 is a view taken as indicated by the line 6 of Fig. 5; Fig. 7 is a top view of the construction of Fig. 5 with the upper plate removed; Fig. 8 is a vertical sectional view taken through the plates showing another modification; Figs. 9, 10, 11, 12, 13 and 14 are views similar to Fig. 8 showing additional modifications; Fig. 15 is a view in side elevation, showing another modification; and Fig. 16 is a top plan view of the construction of Fig. 15.

In the construction of Figs. 1-4, inclusive, 10 and 11 indicate the edges of two adjacent plates which are to be butt welded. As here shown, these edges are beveled, as indicated by 10ª and 11ª, in order to provide the usual groove for the welding metal.

12 and 13 indicate holding members of fingers attached at one end to the faces of the plates 10 and 11, respectively, near their edges. The free end of one of these fingers is preferably curved outwardly, as indicated by 12ª, to facilitate in bringing the edges of the plates into position for welding.

The plates are shown in welding position in Figs. 3 and 4. It will be seen that each finger has one end attached to one plate and overlaps the edge of the adjacent plate, said fingers cooperating to hold the plates in registry and prevent lateral displacement.

In the construction of Figs. 5, 6 and 7, the lower plate 111 carries a curved finger 113 on each side. The edge of the upper plate 110, when placed between these fingers, is held in registry.

In the construction of Fig. 8, we attach a nut or other socket member 212 to the face of the upper plate 210 near the edge and a similar socket member 213 to the corresponding face of the lower plate 211, but somewhat further from the edge. Through the holes in these socket members is loosely fitted an aligning bar 214. Under this bar and against the face of the plate 211 we drive a wedge 215. This wedge can be tightened or loosened until the edges of the plates are in registry, when it will hold them in this position for welding.

In the construction of Fig. 9, we attach a nut or socket member 312 to the face of the upper plate 310 only. We then provide an aligning bar 314 carrying a fulcrum 315. One end of this aligning bar is tapered down, as indicated by 314ª, to fit loosely in the socket member 312. The fulcrum 315 is adapted to bear against the face of the lower plate 311. The aligning bar can then be rocked on the fulcrum from the dotted position to the full line position to bring the plates into registry and hold them for the welding operation.

In the construction of Fig. 10, we provide a similar aligning bar 414 with a fulcrum 415, but instead of providing a socket member attached to the upper plate 410, we attach the upper end of the aligning bar to the plate, as by welding at 416. This welding joint is small enough and the bar is flexible enough to permit rocking on the fulcrum 415 against the plate 411 from dotted position to solid line position to bring the plates into registry.

In the form shown in Fig. 11, the plates are represented by 510 and 511. To each of these plates is attached a nut or socket member 512 and 513, respectively. 514 indicates a bolt connecting the members 512 and 513. Tightening of the nut 514ª on the bolt serves to draw the edges of the plate tightly together.

In the construction of Fig. 12, the plates 610 and 611 have similar nuts 612 and 613 attached to them. Here, instead of using a bolt, there is used a bar 614 having threads at each end. A nut 614ª is placed on each side of the members 612 and 613. With this construction, the plates can be drawn together or separated and held as desired.

In the construction of Fig. 13, a bar 714 has one end attached to the plate 711 and the other end threaded. It is also provided with an offset 714ᵃ. The plate 710 carries a nut 712 through which the threaded end of the bar 714 projects. A nut 714ᵇ is threaded on the bar on each side of the nut 712.

In the construction of Fig. 14, a bolt 815 has its head 815ᵃ welded to the plate 811. The other end of the bolt projects through a nut 812 on the plate 810. Nuts 815ᵇ are provided on each side of the nut 812.

In the construction of Figs. 15 and 16, the plates 910 and 911 are provided with upstanding plates 912 and 913, respectively, arranged substantially at right angles to the edges to be welded. Each of these plates is provided with a hole adapted to receive an aligning bar 914. By moving the bar, the plates 912 and 913 can be shifted relatively to each other to move or hold the edges of the plate in position.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

What we regard as new, and desire to secure by Letters Patent, is:

1. In the art of butt welding the edges of two adjacent plates, a holding member attached to the face of one plate near its edge, and means cooperating with said holding member and the face of the adjacent plate to hold the plates in registry.

2. In the art of butt welding the edges of two adjacent plates, a plurality of holding fingers, each having one end attached to one plate and adapted to overlap the edge of the adjacent plate, said fingers cooperating to hold the plates in registry.

3. In the art of butt welding the edges of two adjacent plates, a socket member attached to the face of one plate adjacent its edge, and an aligning member having one end engaged with said socket and the other end adapted to cooperate with the corresponding face of the adjacent plate to hold the edges of said plates in registry.

4. In the art of butt welding the edges of two adjacent plates, a socket member attached to the face of one plate adjacent its edge, and an aligning member having one end engaged with said socket and the other end adapted to cooperate with a part on the corresponding face of the adjacent plate to hold the edges of said plates in registry.

5. In the art of butt welding the edges of two adjacent plates, socket members on the corresponding faces of said plates adjacent the edges thereof, and an aligning member in said socket members adapted to hold the edges of the plates in registry.

6. In the art of butt welding the edges of two adjacent plates, a socket member attached to the face of one plate near its edge, a lever having one end engaged in said socket member, and a fulcrum between said lever and the corresponding face of the adjacent plate.

7. In the art of butt welding the edges of two adjacent plates, a holding member attached to the face of one plate near its edge and projecting beyond said edge over the same face of the adjacent plate, and a similar holding member attached to the same face of the adjacent plate near its edge and projecting beyond said edge over the same face of the first-mentioned plate.

EDWIN G. DANIELS.
FRANK L. WURST.